Jan. 24, 1967     O. A. GAUDINO     3,300,168
VISOR CLIP
Filed Sept. 15, 1965
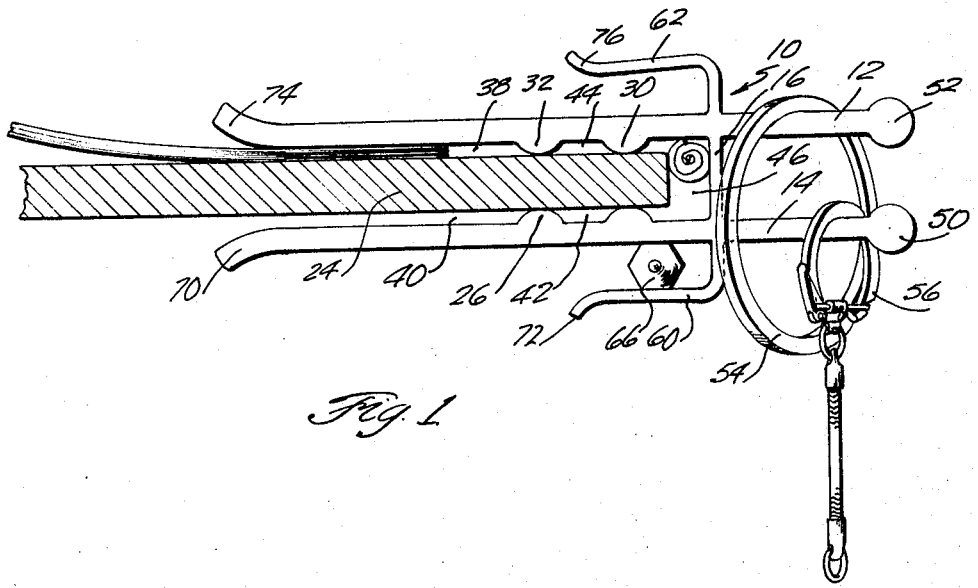
INVENTOR.
ORLANDO A. GAUDINO
BY
*Victor J. Evans & Co.*
ATTORNEYS

3,300,168
VISOR CLIP
Orlando A. Gaudino, 315 Center Ave., Butler, Pa. 16002
Filed Sept. 15, 1965, Ser. No. 487,383
2 Claims. (Cl. 248—229)

The present invention relates to a new and improved multiple use visor clip for use in automobiles and more particularly relates to a significantly improved visor device that provides adequate and additional features not prevously conceived and known in the prior art.

It is an object of the present invention to provide a visor clip having a construction which as a combination is adapted to be applied to a visor and while attached to the visor, provides a holder and retainer means for various articles useful in and about a vehicle, such as a pen, pencils, maps, letters, credit cards, deposit slips, key ring, loops of string, chain or the like.

By means of the present invention, there are nine known and useful ways in which various papers, credit cards, maps and other articles may be applied and stored by use of the visor clip. Also, the present invention has significant and substantial ornamental and design features, such features not found in the prior art.

Other objects and advantages of the present invention will become apparent from the following detailed description and accompanying drawings in which:

FIGURE 1 is a side elevational view of the visor clip shown applied to a visor in cross-section, and to which a sheaf of papers, receipts, and the like, together with a pencil and a ring and key chain are applied for being retained on the visor clip;

FIGURE 2 shows a perspective view of the visor clip as removed from the visor in accordance with the construction, design and ornamental features together with the useful features of the invention.

Referring now to the drawings, there is shown a visor clip 10 formed of a pair of substantially parallel spatially disposed flat members 12, 14, and which are provided with a transversely arranged spacer web member 16 for maintaining the general orientation of the flat members in their parallel relation. The web member 16 is disposed closer to an outer end of the flat members than to the inner end thereof, so that the visor clip 10 may be easily and with facility applied to a vehicle sun visor 24, as shown in FIGURE 1. The visor 24 is shown in cross-section. On the inner and mating surfaces of the flat members, there are disposed a pair of segment contoured or configured ridged extensions 26, 28, 30, 32, so that it is provided with securing or retaining mounting means so that the visor clip 10 may be securely maintained onto the visor 24. By means of the ridged extensions 26, 28, 30, 32, papers, maps, letters, and the like, may be disposed in spaces 38, 40, as shown particularly in FIGURE 1, including credit cards, and the like; whereas, further papers such as deposit slips, trading stamps, and the like, may be similarly disposed within the space provided between the ridges 26, 28, 30, 32, as shown by spaces 42, 44. Additional storage area is provided in space 46, as desired. On the free end of the flat members are disposed a nub element on each of the flat members, nub elements 50, 52 being shown in symmetrical arrangement so that the nub is provided throughout the upper and lower surfaces thereof. The nub element 50, 52 provide for retaining key rings, other types of rings, as well as stringed loops or chain elements from sliding off of the members by means of the nub elements 50, 52. As shown in FIGURE 1, a ring 54 and a key ring 56 are retained by said nub elements.

There is also provided a pair of angled members 60, 62 that are in substantial alignment with the web spacer 16, and attached to the outer or peripheral surface of the flat members 12, 14, and capable of providing retaining space for a pencil 66, pens, or the like. Also provided within the embodiment of the invention are flared ends 70, 72, 74, 76 for the flat members 12, 14, as well as the ends of the angled members 60, 62, respectively.

All of these features are useful in providing retention spaces for papers, maps, letters, credit cards, deposit slips, pens, pencils, rings, and other useful and similar items. Within the scope of the present invention, there are means for retaining cigars, cigarettes between the nubs 50, 52, or within the formed spaces provided by angled members 60, 62, respectively.

The sun visor clip 10 also is a new and improved ornamental design with substantial and significant novel appearance with a substantial measure of symmetry throughout an imaginary planar axis that is disposed along and between the flat members 12, 14.

It should be understood that the specific apparatus herein illustrated and described is intended to be representative only, as many changes may be made therein without departing from the clear teachings of the invention. Accordingly, reference should be made to the following claims in determining the full scope of the invention.

What is claimed is:
1. A visor clip of molded plastic comprising a pair of spatially disposed flat members having a web spacer disposed therebetween to form a clip for attachment to a visor or the like, said flat members having nub elements symmetrically disposed thereon to provide retaining means, a short intermediately disposed angled member extending in alignment with said web spacer and secured to each of the outer surfaces of the flat members for retaining pencils, cigarettes, and like shaped objects therein, the ends of said flat members and said angled members having outwardly generally extending flared ends, and pairs of segment configured ridged extensions on the inner side of each of the flat members to assure secure mounting of the clip on the visor and disposed sufficiently apart on the respective surface of the flat member to retain paper articles and the like therebetween in secure relation.

2. A visor clip of molded plastic comprising a pair of spatially disposed flat members having a web spacer disposed therebetween to form a clip for attachment to a visor or the like, a short intermediately disposed angled member extending in alignment with said web spacer and secured to the outer surface of each flat member for retaining pencils and like shaped objects therein, the ends of said flat members and said angled members proximate to the visor to which it is attached having generally outwardly flared ends, and pairs of segment contoured ridged extensions on the inner surface of each of the flat members to assure secure mounting of the clip on the visor.

References Cited by the Examiner
UNITED STATES PATENTS

| | | | |
|---|---|---|---|
| 989,773 | 4/1911 | Flockhart | 248—121 X |
| 1,236,266 | 8/1917 | Chaikin | 211—96 |
| 1,525,533 | 2/1925 | Brown | 211—96 |
| 1,967,392 | 7/1934 | Boye | 211—96 X |
| 2,564,517 | 8/1951 | Beals | 40—11 |
| 3,136,515 | 6/1964 | Potruch | 248—62 |

CLAUDE A. LE ROY, *Primary Examiner.*